May 9, 1950 G. GOLLIEZ 2,507,336

MUFFLER FORMED OF PLURAL NOZZLES

Filed April 4, 1944 2 Sheets-Sheet 1

INVENTOR:
GEORGES GOLLIEZ
BY Karl B. Mayr
ATTORNEY.

May 9, 1950 G. GOLLIEZ 2,507,336
MUFFLER FORMED OF PLURAL NOZZLES
Filed April 4, 1944 2 Sheets-Sheet 2
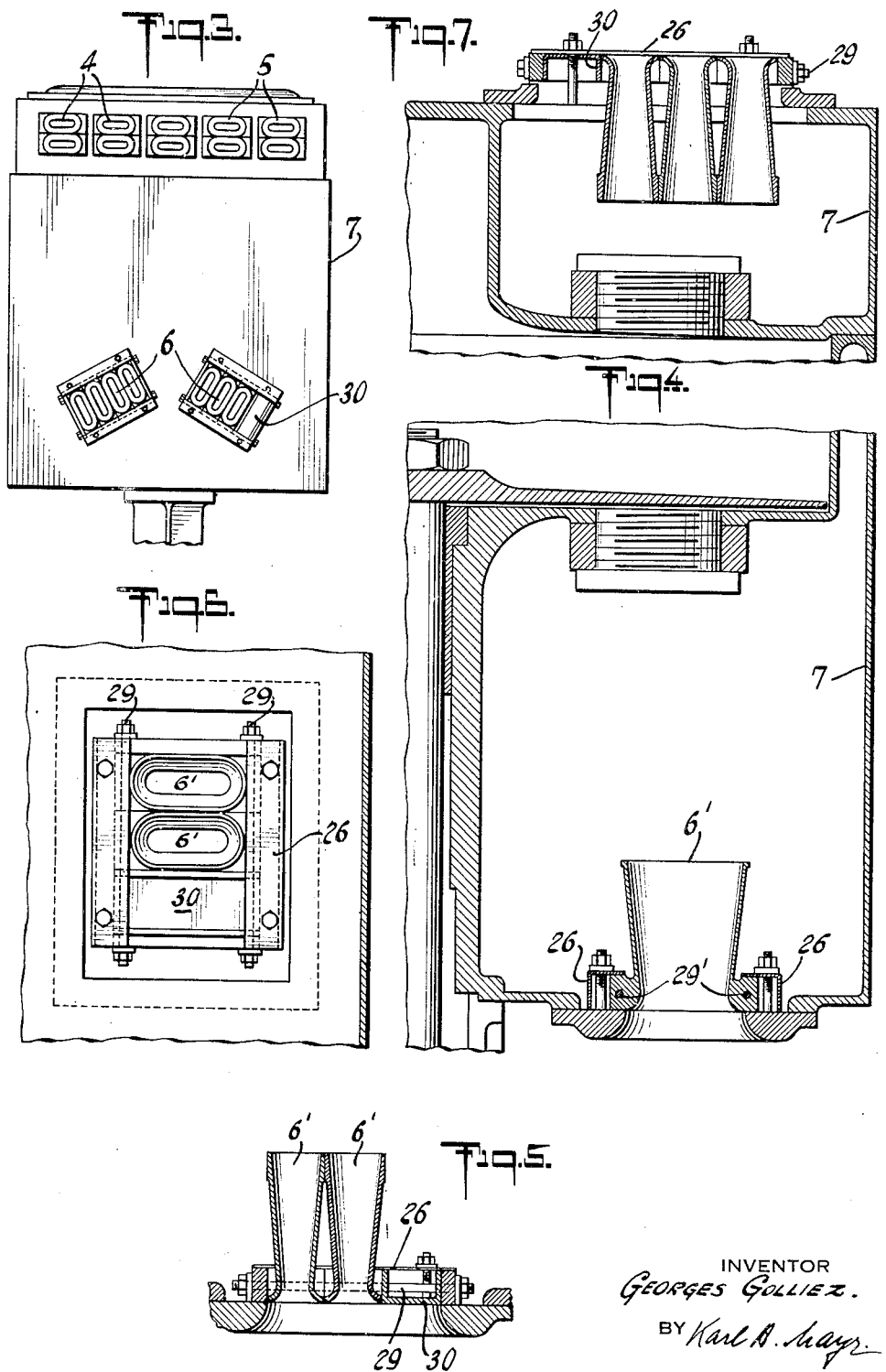

Patented May 9, 1950

2,507,336

UNITED STATES PATENT OFFICE 2,507,336

MUFFLER FORMED OF PLURAL NOZZLES

Georges Golliez, Lausanne, Switzerland

Application April 4, 1944, Serial No. 529,547

5 Claims. (Cl. 181—46)

The invention relates to a device for damping the sound from pulsating streams of gas by the use of individual throttling elements designed in the form of nozzles and consists in that these individual elements can be combined to form sound damping bodies of honeycomb form and any required size. The single elements can be manufactured from light metals. The elements may be placed vertically, horizontally or at least in part obliquely. The inlet lips of the single elements may form the flanges of the elements for purposes of attachment.

It is known to design the suction pipes of internal combustion engines as Venturi pipes in which the velocity of the medium drawn in reaches the velocity of sound where the cross-section is narrowest. These devices produce a good damping effect but also create a considerable suction vacuum before the engine. Further this sound damping device also requires to be specially adapted to each particular case.

Embodiments of the invention are shown diagrammatically and by way of example in the drawing.

Fig. 3 is another view of the compressor from the suction end whereby the position of part of the sound damping devices is modified.

Fig. 4 shows a longitudinal section through the lower part of a compressor having the sound damping devices according to the invention disposed at the bottom.

Fig. 5 shows a section through the set of nozzles shown in Fig. 4 taken at right angle to the section shown in Fig. 4.

Fig. 6 is a view of the set of nozzles shown in Figures 4 and 5, taken from the inside of the compressor.

Fig. 7 is a sectional view of the upper portion of a compressor having a set of nozzles according to the invention disposed in the top wall.

Like numerals designate like elements in all figures of the drawings.

Figure 1:
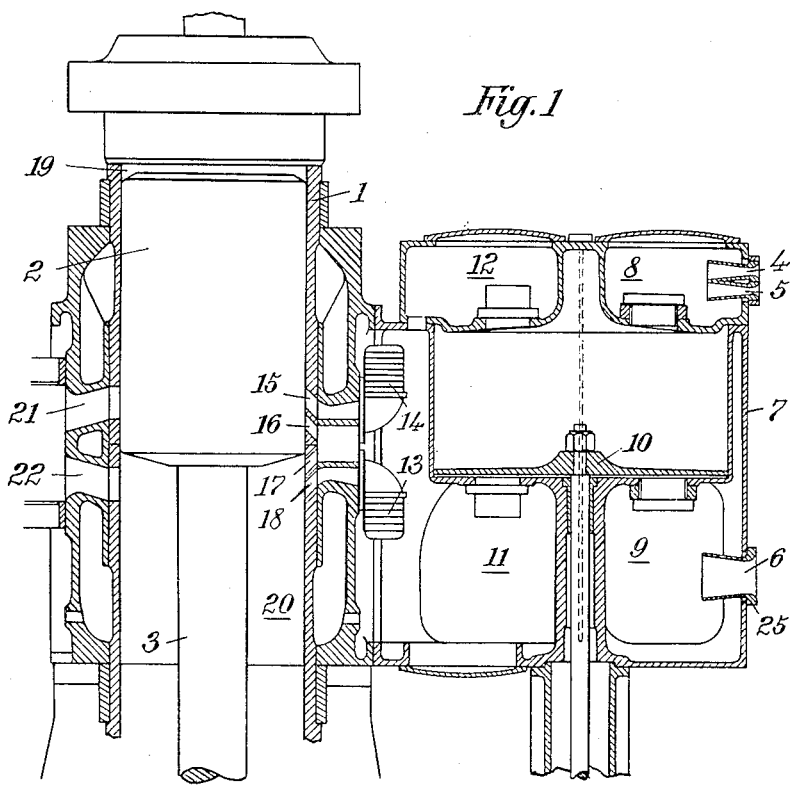
Fig. 1 is a section through an internal combustion engine with a compressor equipped with devices according to the invention.
Figure 2:
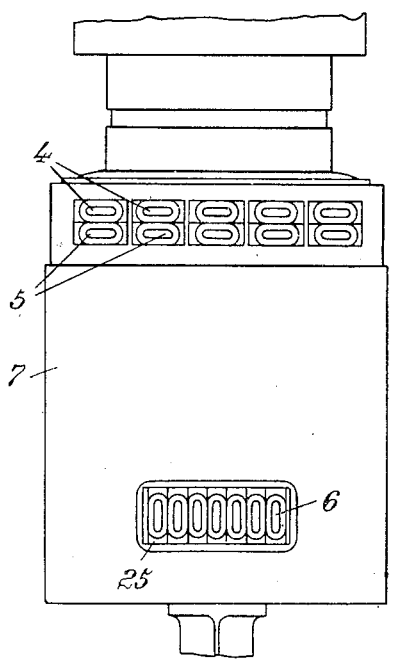
Fig. 2 is a view of the compressor shown in Fig. 1 from the suction end.

In cylinder 1 work is done and is transmitted through the piston 2 and the piston rod 3 to the crankshaft not shown in the drawing. The nozzles 4, 5 and 6 used for sound damping, the cross-section of which is shown elongated but may be circular or of some other form, are provided in the compressor casing 7. They are in communication with the suction valves 8, 9. The piston 10 of the compressor 7 forces the compressed air through the delivery valves 11, 12 into the cylinder 1, the air passing first through the valves 13, 14 and then through the inlet ports 15, 16 and 17, 18 into the cylinder spaces 19 and 20 respectively. The exhaust gases present after combustion enter the exhaust pipes 21, 22.

As the single elements 4, 5 and 6 are so made that they can be combined in aggregates of a honeycomb form and of any required size, it is possible to obtain any desired cross-section for the suction air inlet as a multiple of the nozzle cross-section. The single element can consist of light metal, for instance aluminium, so that it can be manufactured without any special machining. The combination of the nozzles can be carried out in a simple manner.

The nozzles can be built-in singly or in groups in any position desired, for instance, according to space requirements, they can be built-in in a horizontal position like the elements 4, 5 or in a vertical position like the elements 6. They may be set at an angle as shown in Fig. 3. The inlet lips 25 may form flanges for the purpose of fixing the elements. The combination of the nozzles to form groups can be carried out by means of tie-rods 29 passing through them, while their attachment to the casing can be done by means of expanding yokes such as angle irons 26, as shown in Figs. 4 to 7. In order to increase the speed of flow inside the nozzles, individual elements can be omitted and replaced by blank pieces 30 having the same sectional area as the nozzle elements, as shown in Figs. 3 and 5 to 7.

The average speed of flow can amount to between 60 and 200 meter/sec. where the cross-section is narrowest, as within these limits of velocity the best damping effect is encountered and the throttling losses are still inconsiderable.

Groups of individual elements 6' may be arranged in the bottom portion of the compressor 7 as shown in Fig. 4, or in the top of the compressor 7 as shown in Fig. 7.

The nozzles provided for sound damping may be designed to have elongated cross-sections.

I claim:

1. A muffler for pulsating gas streams in machines having a casing, said muffler comprising a plurality of identical individual Venturi-nozzle elements individually having a rectangular rim portion extending around the inlet of the nozzle, the long sides of said portions of different elements being adjacent, and bolts extending through said rim portions transversely to the long sides thereof for interconnecting said elements to form a package adapted to be inserted in said casing.

2. A muffler for pulsating gas streams in machines having a casing, said muffler comprising a plurality of identical individual Venturi-nozzle elements individually having a rectangular rim portion extending around the inlet of the nozzle, the long sides of said portions of different elements being adjacent, the small sides of said rim portions forming flanges adapted to be connected with said casing, and connecting means extending through said flanges transversely to the long sides of said rim portions for interconnecting said elements to form a package.

3. A muffler for pulsating gas streams in machines having a casing, said muffler comprising a plurality of identical individual nozzle elements individually having an angular rim portion extending around the inlet of the nozzle, the sides of the rim portions of different elements being adjacent, and means joining said rim portions for interconnecting said elements to form a package adapted to be inserted in said casing.

4. A muffler for pulsating gas streams in machines having a casing, said muffler comprising a plurality of identical individual Venturi-nozzle elements individually having a rectangular rim portion extending around the inlet of the nozzle, the long sides of said portions of different elements being adjacent, and means joining said rim portions for interconnecting said elements to form a package adapted to be inserted in said casing.

5. A muffler for pulsating gas streams in machines having a casing, said muffler comprising a plurality of identical individual Venturi-nozzle elements individually having a rectangular rim portion extending around the inlet of the nozzle, the long sides of said portions of different elements being adjacent, the small sides of said rim portions forming flanges adapted to be connected with said casing, and connecting means joining said flanges for interconnecting said elements to form a package.

GEORGES GOLLIEZ.

REFERENCES CITED

The following references are of record in the file of this patent:

UNITED STATES PATENTS

| Number | Name | Date |
|---|---|---|
| 973,472 | Broadbent | Oct. 25, 1910 |
| 1,578,682 | Raymond | Mar. 30, 1926 |
| 1,740,805 | Brice | Dec. 24, 1929 |
| 1,916,908 | Stacy, Jr., et al. | July 4, 1933 |
| 2,075,316 | Tyden | Mar. 20, 1937 |
| 2,312,597 | Somes | Mar. 3, 1943 |

FOREIGN PATENTS

| Number | Country | Date |
|---|---|---|
| 1,773 | Great Britain | 1871 |
| 15,178 | Great Britain | May 16, 1916 |
| 286,715 | Great Britain | Nov. 29, 1928 |
| 394,601 | Great Britain | June 29, 1933 |
| 436,386 | Great Britain | Oct. 10, 1935 |
| 439,773 | Great Britain | Dec. 13, 1935 |
| 86,514 | Sweden | June 9, 1936 |
| 156,689 | Sweden | Nov. 1, 1932 |